May 17, 1927.  A. T. STURT  1,629,320
MOTOR VEHICLE FRAME
Filed May 17, 1922  3 Sheets-Sheet 3
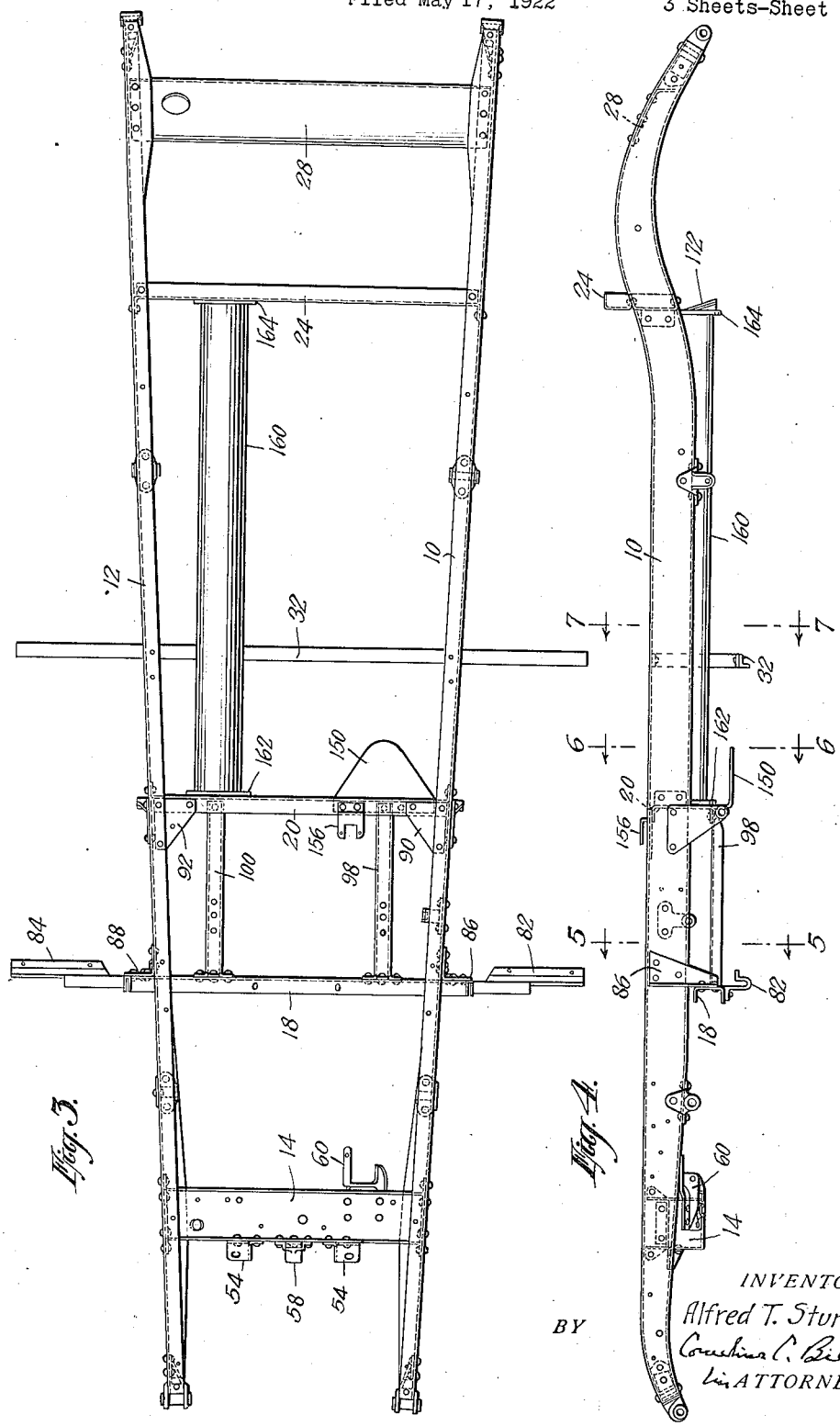
INVENTOR
Alfred T. Sturt
BY Cornelius C. Billings
his ATTORNEY Patented May 17, 1927.

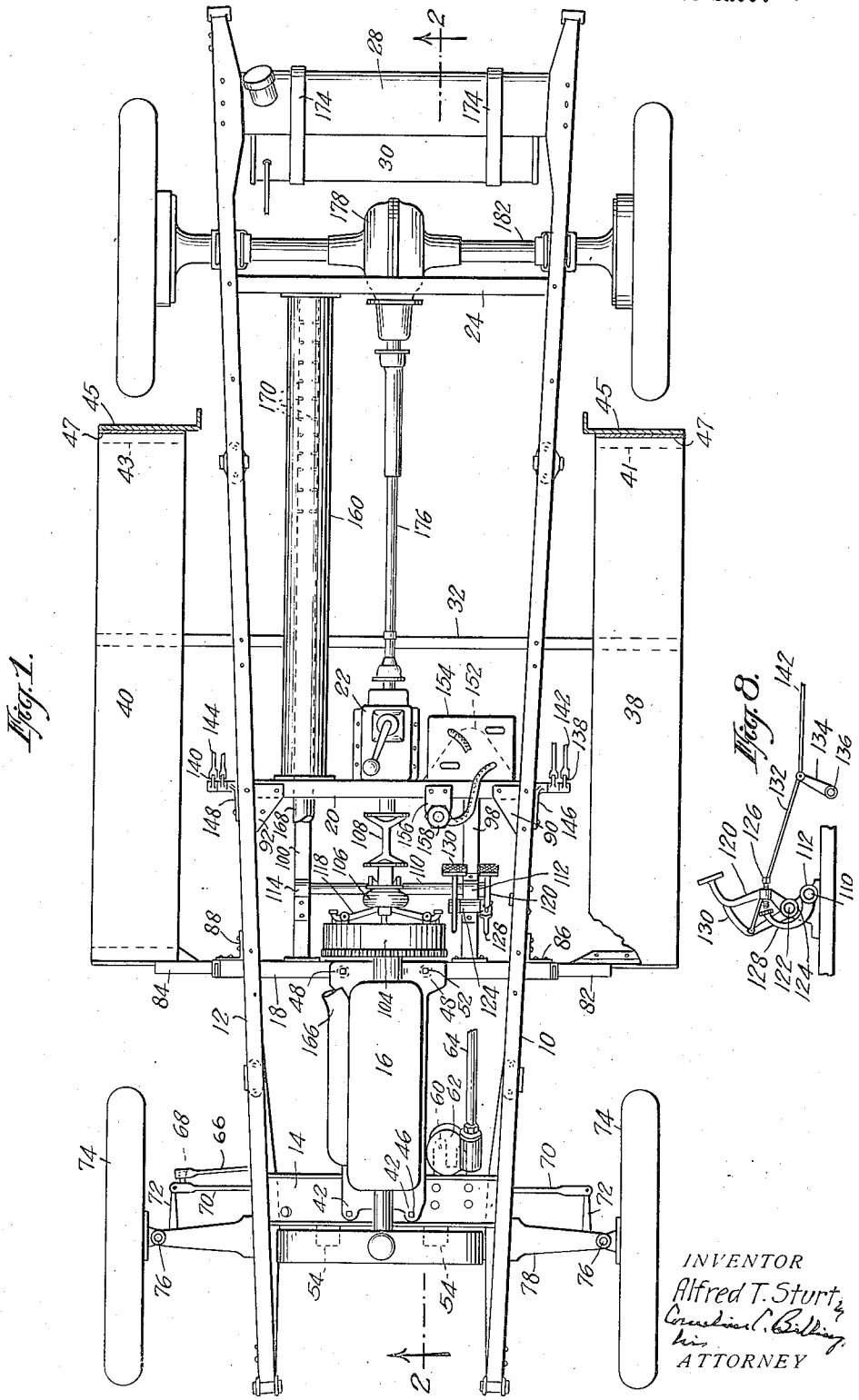

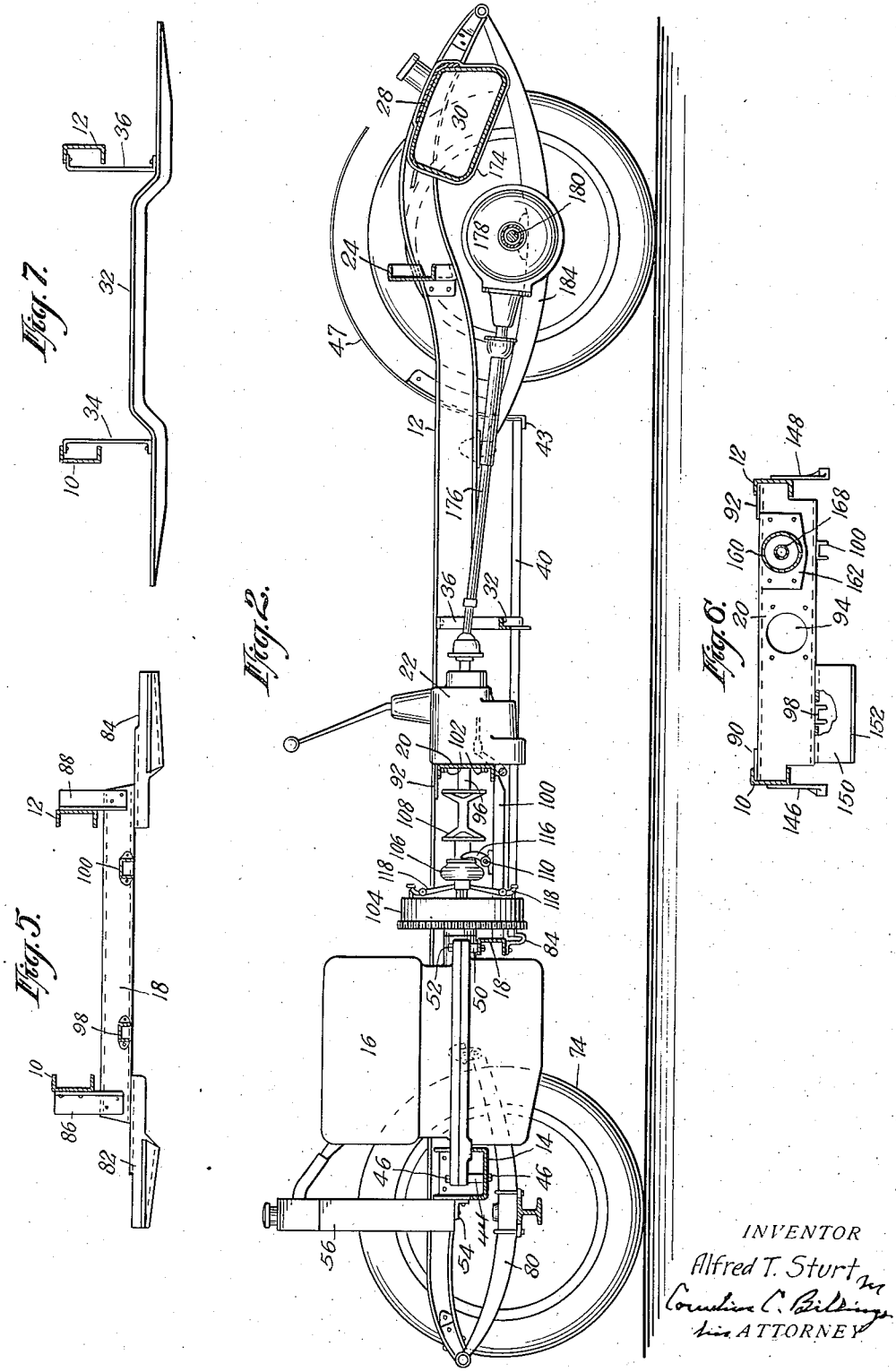

1,629,320

UNITED STATES PATENT OFFICE.

ALFRED T. STURT, OF FLINT, MICHIGAN, ASSIGNOR TO DURANT MOTORS INCORPORATED, A CORPORATION OF DELAWARE.

MOTOR-VEHICLE FRAME.

Application filed May 17, 1922. Serial No. 561,610.

This invention relates to motor vehicles and particularly to a chassis including a frame of improved design.

The invention aims to provide a frame having transverse members arranged to support the radiator, the steering gear, engine and its associated accessories, the transmission, the clutch and brake operating pedals, the running board, the fuel tank and the body of the vehicle. Certain of the transverse members are connected by longitudinal struts which stiffen the frame in the zone of the engine and its associated parts and afford supports for the clutch and brake operating mechanism, and a longitudinal member of generous size is provided to stiffen the whole frame against torsional strains.

In the accompanying drawings illustrating one embodiment of the invention:

Fig. 1 is a plan view of a chassis showing my improved frame.

Fig. 2 is a sectional elevation on line 2—2 of Fig. 1.

Figs. 3 and 4 are respectively a plan and side elevation of the improved frame with the parts supported thereby omitted in the interest of clearness.

Figs. 5, 6 and 7 are transverse vertical sections on the correspondingly numbered sectional lines indicated on Fig. 4.

Fig. 8 is a detail of the clutch and brake operating mechanism shown in Fig. 1.

Referring to the drawings, the frame comprises left and right longitudinal members 10 and 12, a transverse member 14 for supporting the front of the engine 16, a member 18 for supporting the rear of the engine, a transverse member 20 for supporting the transmission 22, rear cross members 24 and 28, the fuel tank 30 being suspended from the member 28. An intermediate cross member 32 suspended from hangers 34 and 36 is provided to support the running boards 38 and 40 intermediate the ends thereof. The rear ends of the running boards are supported on steps 41 and 43 formed on brackets 45 which are secured to and form part of the rear fenders 47. The brackets 45 are suitably secured to the body of the car.

The engine is provided with lugs 42 in front which rest on blocks 44 secured to the front member 14 by bolts 46. The rear of the engine is provided with lugs 48 which rest on blocks 50 and bolts 52 are provided to secure the engine to the transverse member 18.

The front cross member is provided with brackets 54 which support the radiator 56 and a bearing 58 (Fig. 3) for guiding the usual starting crank. The front cross member 14 also carries a bracket 60 to which the housing 62 is connected. In this housing is located the usual steering worm and gear which is connected in the usual manner to the steering column shaft 64. The steering shaft transmits motion to the reach rod 66 which is connected by a ball joint 68 to the cross rod 70 which in turn is connected to the steering knuckles 72 which carry suitable spindles for the front wheels 74. The knuckles 72 are pivoted on king pins 76 secured in the ends of the front axle 78 which is carried by the springs 80 secured to the frame members 10 and 12 by suitable shackles.

In addition to supporting the rear of the engine the member 18 carries at its ends outwardly extending brackets 82 and 84 to which the front ends of the running boards 38 and 40 are secured. The member 18 is located below the longitudinal members 10 and 12 and is secured to brackets 86 and 88 which are riveted to the frame, as shown clearly in Figs. 3 and 4.

The member 20 is secured to the longitudinal members of the frame by gussets 90 and 92 and is provided with a central opening 94 through which the driving shaft 96 extends.

Longitudinal struts 98 and 100 are connected to the members 18 and 20, as shown in Figs. 1 and 3 and serve to amply stiffen this zone of the frame in juxtaposition to the engine and transmission. The transmission is secured to the member 20 by bolts 102 which pass through suitable holes in said member.

The fly wheel-clutch 104, clutch collar 106 and flexible universal joint 108 are located between the members 18 and 20. The clutch operating shaft 110 is carried in bearings 112 and 114 which are very conveniently supported by the struts 98 and 100 as shown in Fig. 1. The clutch shaft carries a yoke 116 arranged to engage the clutch collar 106 which in turn actuates the clutch dogs 118. The clutch shaft 110 is arranged to be rocked by a clutch pedal 120 loosely pivoted on a stub shaft 122 carried in a hub 124 formed on the bearing 112. The clutch pedal is provided with an adjustable screw 126 arranged to engage a head formed on the end of a lever 128 carried by the clutch shaft 110 so that when the pedal is pushed forward the shaft 110 will be rocked and the dogs 118 actuated to disengage the clutch.

The stub shaft also loosely supports the service brake pedal 130 which is connected by a rod 132 with a lever 134 secured to a suitable cross shaft 136 which carries on its outer ends levers 138 and 140 connected by rods 142 and 144 with the brakes not shown. It will thus be seen that the struts 98 and 100 provide means for rigidly tying the members 18 and 20 to one another and also serve to support the clutch and brake operating or control mechanism. The brake shaft 136 is supported at its outer ends in bearings 146 and 148 secured to the members 10 and 12, shown in Figs. 3 and 6.

The member 20 in addition to supporting the transmission 22 also carries a depending bracket 150 having a shelf portion 152 which supports the usual storage battery 154, and a bracket 156 which carries the usual starting switch 158.

Extending longitudinally of the frame is a cylindrical member 160 to which plates 162 and 164 are secured which serve as connections for fastening said member 160 rigidly to the transverse members 20 and 24. This member 160 serves to brace the entire frame against torsional strains to which chassis frames are subjected in travelling over rough and undulating roads. The member 160 is hollow and is connected to the exhaust manifold 166 of the engine by a pipe 168 which extends into the interior of said hollow member. The pipe 168 is provided with a plurality of parts 170 through which the exhaust gas is discharged and the member 160 is provided with an outlet lip 172 through which the spent gases are discharged. Thus it is seen that this member serves as a muffler as well as a stiffener.

The rearmost transverse member 28 is crowned to conform to the shape of the fuel tank 30 and straps 174 are secured thereto to rigidly hold the tank in place. This transverse tank supporting member also forms a protecting shield for the tank to protect the same against injury when the car is inadvertently backed against a stationary object, or when it is struck from the rear by another car and from impacts or blows by any other extraneous object.

Power is transmitted from the transmission 22 by a suitable propeller shaft 176 through the usual differential located in the housing 178 to the rear axle 180. The axle housing 182 is supported by springs 184 which are secured by suitable shackles to the frame members 10 and 12 in the usual manner.

From the foregoing it is apparent that the invention provides a frame of novel design having members for supporting all the necessary mechanism of a motor vehicle. The supporting members are so located that the various parts can be readily inspected and lubricated or taken down for replacement or repair when necessary.

The entire frame is of comparatively light weight yet is so braced and stiffened that it forms an extremely rigid foundation for the power plant, transmission mechanism and the various accessories.

While I have described in great detail the particular embodiment of the invention herein illustrated it is not to be construed that I am limited thereto as changes in arrangement and substitution of equivalents may be made by those skilled in the art without departing from the invention as defined in the appended claims.

Having thus described my invention what I claim as new and desire to secure by Letters Patents is:

1. A motor vehicle frame comprising a pair of longitudinal members, a transverse engine supporting member located below said longitudinal members and carried by brackets secured thereto, a transverse transmission supporting member secured to said longitudinal members, a battery supporting bracket secured to said transmission supporting member and longitudinal struts connecting said engine supporting member and said transmission supporting member..

2. A motor vehicle frame comprising a pair of longitudinal members, a transverse member for supporting the rear of the engine, brackets secured to said member for supporting the front end of the running boards, and a cross member hung from said longitudinal members for supporting the running boards intermediate their ends.

3. A motor vehicle frame comprising a pair of longitudinal members, a transverse member for supporting the rear of the engine, a transmission supporting member secured to said longitudinal members and braced by longitudinal struts secured to said rear engine supporting member, a rear cross member and a longitudinal tubular torsional member secured respectively at its front and rear ends to said transmission supporting member and to said rear cross member to stiffen the entire structure.

4. A motor vehicle frame including a pair of longitudinal members, a transverse member for supporting the front of the engine, a second transverse member for supporting the rear of the engine, a supporting member to the rear face of which the transmission is secured and means supported by said two last named members for supporting the clutch and rake operating mechanism.

5. A motor vehicle frame comprising a pair of converging longitudinal members and the following transverse member in the order stated from front to rear, a front engine support provided with means for supporting the radiator and steering mechanism, a rear engine support, a transmission support connected by struts with the rear engine support, and a rear cross member connected with said transmission support by a tubular longitudinal member.

6. A motor vehicle frame comprising a pair of converging longitudinal members and the following transverse members in the order stated from front to rear, a front engine support provided with means for supporting the radiator and steering mechanism, a rear engine support, a transmission support connected by struts with the rear engine support, a member for supporting the running boards intermediate their ends and a rear cross member connected with said transmission support by a longitudinal member adapted to stiffen the whole structure.

7. A motor vehicle frame including a pair of longitudinal members, a transverse member for supporting the front of the engine, a second transverse member for supporting the rear of the engine, a supporting member to the rear face of which the transmission is secured and means supported by said two last named members for supporting the clutch and brake operating mechanism, a transverse member secured at the rear end to the upper flanges of said longitudinal members and means for securing the fuel tank to said transverse member.

In witness whereof I have hereunto set my hand at Long Island City, county of Queens, State of New York, this 13th day of May, 1922.

ALFRED T. STURT.